C. K. JOHNSON.
RIDING ATTACHMENT FOR HARROWS.
APPLICATION FILED APR. 25, 1917.

1,343,827.   Patented June 15, 1920.

Witnesses
R. Wakefield
P. H. Pattison

Inventor
C. K. JOHNSON
By Chandler & Chandler
Attorneys

UNITED STATES PATENT OFFICE.

CHARLES K. JOHNSON, OF DANUBE, MINNESOTA.

RIDING ATTACHMENT FOR HARROWS.

1,343,827. Specification of Letters Patent. Patented June 15, 1920.

Application filed April 25, 1917. Serial No. 164,460.

*To all whom it may concern:*

Be it known that I, CHARLES K. JOHNSON, a citizen of the United States, residing at Danube, in the county of Renville, State of Minnesota, have invented certain new and useful Improvements in Riding Attachments for Harrows; and I do hereby declare the following to be a full, clear, and exact description of the invention, such as will enable others skilled in the art to which it appertains to make and use the same.

This invention relates to new and useful improvements in riding attachments for harrows, and has for its primary object to provide a device of this character more particularly adapted for use in connection with harrows of the gang type.

A further object of the invention is to provide a device of this character which may be attached to any type of gang harrow.

Referring to the drawings.

Figure 1:
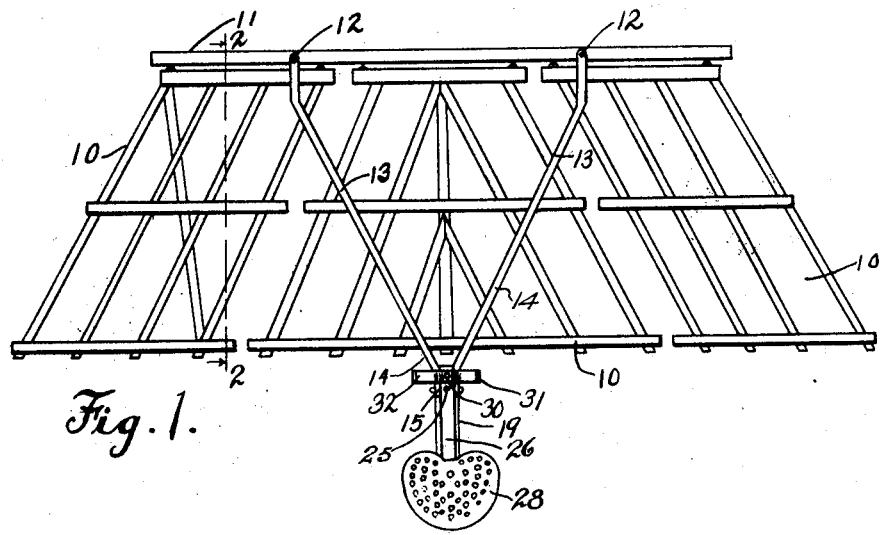
Figure 1, is a top plan view of a harrow showing the device attached thereto.
Figure 2:
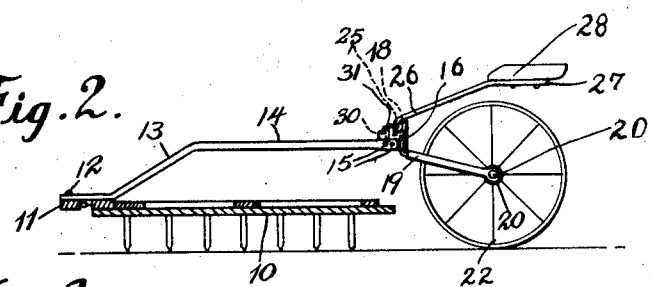
Fig. 2, is a transverse sectional view on the line 2—2 of Fig. 1.
Figure 3:
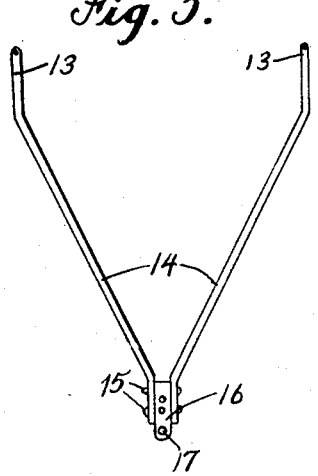
Fig. 3 is a detail plan view of the arms.
Figure 4:
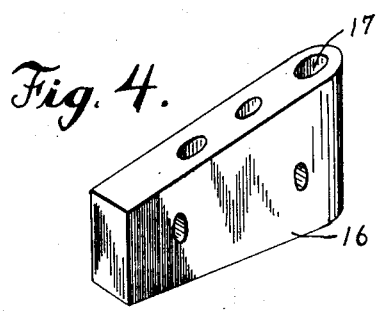
Fig. 4 is a detail perspective view of the block.
Figure 5:
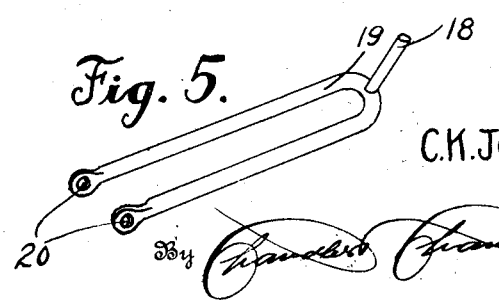
Fig. 5 is a detail perspective view of the fork.

Referring more particularly to the drawings, the reference character 10 designate harrows which are secured together to form a gang by means of a rigid bar or the like 11, this being done in any desired manner.

Connected to the bar as at 12 are two arms 13 extending upward and rearward over the harrows, converging at 14, and passing at their rear ends alongside a block 16 to which they are secured as by bolts 15. The block has its upper edge inclined upward and rearward, and through the block are formed three vertical holes 17. In one of these is mounted the stem 18 of a fork 19 whose arms have bearings 20 for the shaft of a caster wheel 22. In another hole is seated a stud 25 at the forward end of a standard 26, the rear end 27 of which supports a seat 28. In the third hole 17 is seated a stud 30 carrying a cross bar 31 which has foot rests 32.

In operation, the frame is adapted to be attached to the rigid bar 11 of the harrow, and the vertical stem 18 of the fork 19 is adapted to swivel in an opening 17 of the block 16. With the parts in this position the operator may ride the seat 28 with his feet in the foot rest and it will be seen that the caster wheel is free owing to its swiveled mounting to follow the harrow regardless of the direction it may take.

It will thus be seen that the present invention provides a device of this character which is particularly comfortable for the operator; a device which may be attached to any type of gang harrow, and also a device which is cheap and easy to manufacture.

Having thus described the invention, what is claimed, is:

A riding attachment for harrows comprising a main bar adapted for connection with with the harrow, rearwardly converging arms fixed to the bar and their rear ends elevated above the harrow, a block bolted between said ends and having three vertical holes, a seat standard having a stud removably engaged in one of the holes, a foot rest having a stud removably engaged in another, and a caster wheel having a fork provided with a stem removably engaged in the remaining hole.

In testimony whereof, I affix my signature in the presence of two witnesses.

CHARLES K. JOHNSON.

Witnesses:
A. N. NELSON,
H. C. BURMINGHAM.